United States Patent [19]

Dasgupta et al.

[11] Patent Number: 5,409,868
[45] Date of Patent: Apr. 25, 1995

[54] CERAMIC ARTICLES MADE OF COMPOSITIONS CONTAINING BORIDES AND NITRIDES

[75] Inventors: Sankar Dasgupta; Rakesh Bhola; James K. Jacobs, all of Toronto, Canada

[73] Assignee: Electrofuel Manufacturing Co., Ontario, Canada

[21] Appl. No.: 172,195

[22] Filed: Dec. 23, 1993

[51] Int. Cl.$^6$ .............................. C04B 35/58
[52] U.S. Cl. ...................... 501/96; 501/98; 501/103; 51/307
[58] Field of Search .................. 501/96, 98, 103; 51/307; 252/520

[56] References Cited

U.S. PATENT DOCUMENTS

| | | |
|---|---|---|
| 3,256,103 | 6/1966 | Martin et al. . |
| 3,803,707 | 4/1974 | Passmore et al. . |
| 4,394,170 | 7/1983 | Sawaoka et al. . |
| 4,528,120 | 7/1985 | Hunold et al. . |
| 4,795,723 | 1/1989 | Nishikawa et al. ............ 501/98 |
| 4,847,031 | 7/1989 | Parent et al. . |
| 4,933,308 | 6/1990 | Nishio et al. ............ 501/87 |
| 5,045,512 | 9/1991 | Lange et al. ............ 501/96 |
| 5,185,112 | 2/1993 | Saito et al. . |
| 5,185,300 | 2/1993 | Hoggard et al. . |
| 5,200,372 | 4/1993 | Kuroyama et al. . |

Primary Examiner—Karl Group

[57] ABSTRACT

A composition is described for hard sintered ceramic articles having densities which are 97% or higher than the theoretical density. The composition contains up to 98.5 vol. % titanium diboride, 0–59 vol % aluminum nitride, 0–59 vol. % hexagonal boron nitride, 0–59 vol. % zirconium nitride, and in addition, zirconia, hafnia or ceria having particle size 0.7 μm or less, in 1.5 vol. % and optionally, a sintering aid in less 2 vol. %. The mixture of the above components is further mixed and ground by ball-milling and vibro-milling in the presence of an aliphatic alcohol, cast into required shapes and sintered in an inert gas at temperatures below 1950° C. The sintered ceramic articles obtained of this composition include ceramic cutting tool inserts, impact-resistant ceramic structures, nozzles, extrusion dies and ceramic evaporating boats.

13 Claims, 3 Drawing Sheets

MAGNIFICATION 1150x

CERAMIC ARTICLES MADE OF COMPOSITIONS CONTAINING BORIDES AND NITRIDES

FIELD OF THE INVENTION

This invention relates to wear resistant ceramic compositions and articles made thereof. More particularly, this invention relates to ceramic articles made of mixtures of borides and nitrides having densities close to the theoretical density.

BACKGROUND OF THE INVENTION

Sintered ceramic articles which are made of mixtures of borides and nitrides and other refractory components have been known. Such ceramic articles include ceramic cutting tools, nozzles, resistive refractory boats and similar articles, use of which require hardness, toughness, resistance to wear and to corrosion by molten metals at high temperatures. In the case of refractory boats, electrical conductivity of the sintered ceramic product is an additional requirement.

Conventional boride based ceramic compositions are known to have high hardness, toughness, corrosion resistance, but often have densities which are below the most advantageous density value. An example of compositions for hot pressed and sintered, hard refractory articles is U.S. Pat. No. 3,256,103 issued to Martin A. Roche et al. on Jun. 14, 1966. The mixture for the refractory articles contains titanium boride, boron nitride and titanium nitride. The density of these articles however, have been found to be insufficiently high to withstand prolonged wear and corrosion by molten metals.

Sintered hard ceramic articles, and a method and apparatus for compacting such articles are described in U.S. Pat. No. 4,394,170 issued to Akira Sawaoka et al. on Jul. 19, 1983. The compositions of Sawaoka et al. include two types of boron nitrides, several other nitrides, borides, oxides and a metal. Sawaoka et al. utilizes a press described therein to compact and hot-press the articles made of compositions taught in U.S. Pat. No. 4,394,170. Hiroaki Nishio et al. in U.S. Pat. No. 4,933,308 issued Jan. 12, 1990 describe compositions to obtain sintered ceramic articles having high strength and high fracture toughness. The notable components of the compositions of Nishio et al. are titanium diboride, up to 30 wt. % silicon carbide and 2–20 wt. % zirconium dioxide. Yttria, magnesia, ceria are also added in amounts related to the amount of zirconia present together with small amounts of other borides and carbides, which are added to control grain growth. The articles prepared and cast by Nishio et al. are sintered in two stages; first at 1600°–2000° C. in a non-oxidizing atmosphere, then the articles are further densified by hot isostatic pressing (HIP). Densities of sintered articles range between 95–99% of theoretical densities.

Hajime Saito et al. in U.S. Pat. No. 5,185,112 issued on Feb. 9, 1993 describe sintered ceramic articles obtained by mixing titanium boride with chromium and graphite powder and a binder, and compacting the mixture obtained at high pressure at ambient temperature. The articles so obtained are subsequently sintered in a non-oxidizing atmosphere at temperatures up to 2000° C. Chromium carbide and chromium boride embedded in the titanium diboride matrix are other notable components of the sintered articles made of compositions of Saito et al.

Ceramic boats self-heated by resistance heating are often used for vaporizing metals, more particularly aluminum and its alloy. It is usual that such boats have an electrically conductive ceramic component to provide the required resistivity. The boat however, also has to be made of a hard wearing, refractory composition which is also resistant to corrosion by molten metal. Most of the conventional compositions referred to hereinabove, are capable of conducting electricity and hence, apart from being utilized in the manufacture of wear-resistant articles, may also be used in the production of self-heated ceramic boats, also known as evaporating boats.

The electrical, chemical and mechanical demands on such boats are very high, resulting in relatively short life-span of the boats. There are conventional methods for recycling spent evaporating boats to production by grinding the boats, and mixing the ground particles with titanium boride, boron nitride, aluminum nitride to obtain the required composition, casting the mixture into billets or ingots and machining the ingots sintered at high temperature to obtain ceramic boats.

In some instances it was found that conventionally manufactured ceramic boats exhibited directional properties, which resulted in reduced lifespan of such boats. Passmore et al. in U.S. Pat. No. 3,803,707 issued on Apr. 16, 1974, teach the casting and pressing of ceramic ingots composed of titanium diboride, boron nitride, and optionally aluminum nitride into cylindrical ingots, and subsequently machining boats from the ingots, such that the longitudinal axis of the boats are at right angles to the longitudinal axis of the cylindrical ingot. It may be seen that the method taught by Passmore et al. may lead to some wastage of relatively costly material. Thus it may be concluded that a ceramic composition that would allow the manufacture of ceramic evaporating boats from cast ceramic ingots which have substantially non-directional properties, could reduce the cost of production and utilization of the ceramic boats.

Klaus Hunold et al. in U.S. Pat. No. 4,528,120 issued on Jul. 9, 1985 describe a ceramic composition for sintered electrically conductive articles having non-directional properties. The components of the composition of Hunold et al. include hexagonal boron nitride, aluminum nitride or silicon nitride and an electrically conductive boride or carbide. The cast article made of the composition of Hunold et al. is subsequently sintered in two stages: first sintering in an inert gas at about 800° C., then encasing the cast articles in a refractory metal and subjecting the encased ceramic article to hot isostatic pressing (HIP) in an inert atmosphere.

It is to be noted that most of the ceramic articles made of the above described conventional compositions have densities which deviate from the theoretical density in varying degrees. Densities which are close to the theoretical density are usually attained only by means of costly high pressure process steps applied at high temperatures.

It may be seen from the foregoing that there is a need for compositions that provide dense sintered ceramic articles by relatively inexpensive production process steps.

SUMMARY OF THE INVENTION

By one aspect of the present invention a hard ceramic article is provided which is wear and corrosion resistant, has high fracture toughness, density close to the theoretical density, is made of a composition having relatively inexpensive components and may be produced by a relatively inexpensive pressing and sintering process.

By another aspect of the present invention a hard, electrically conductive and dense ceramic evaporating boat is provided, which is resistant to corrosion by molten metals, having substantially non-directional properties, which may be produced by uni-axial pressing and/or sintering, and subsequent machining.

A new composition has been found for sintered ceramic articles essentially consisting of:
- 40–98.5 vol. % titanium diboride,
- 0–59 vol. % aluminum nitride,
- 0–59 vol. % zirconium nitride,
- 0–59 vol. % hexagonal boron nitride, an oxide additive selected from the group consisting of zirconia, hafnia and ceria in an amount limited to 1.5 vol. %, having particle size 0.7 $\mu$m or less, and optionally, a sintering aid selected from the group consisting of cobalt diboride and nickel diboride. The density of the ceramic articles made according to this composition, subsequent to sintering, is greater than 97% of the theoretical density.

The sintered ceramic articles made according to the present invention include impact-resistant ceramic panels, ceramic cutting tool inserts, nozzles, evaporating boats and similar hard, wear resistant articles, which are also resistant to corrosion by hot metal. The properties of the sintered ceramic articles may be further enhanced by adding a portion of the boron nitride as boron nitride fibres.

Figure 1A:
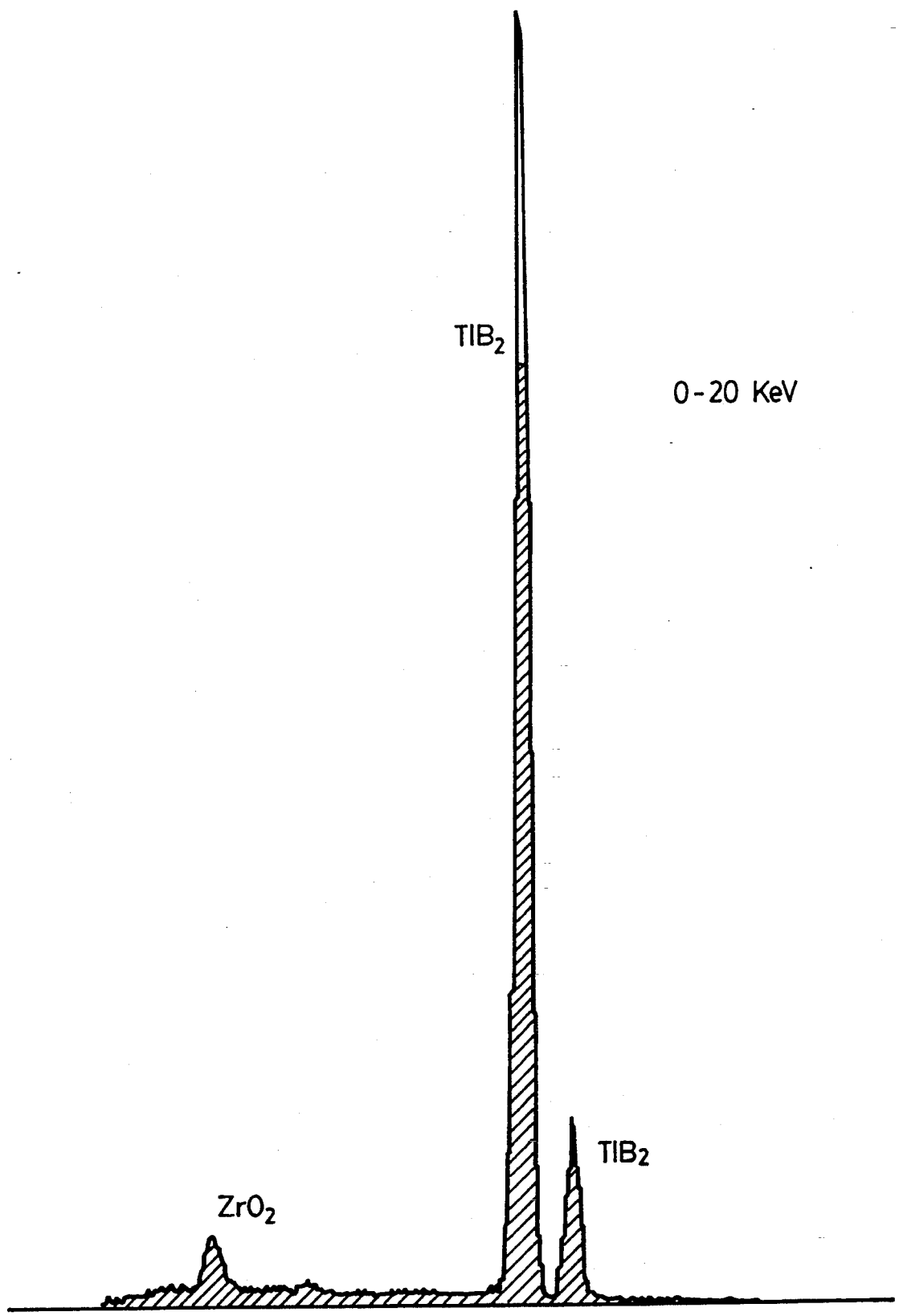
FIGS. 1/a, 1/b and 1/c show the EDAX and X-ray diffraction patterns, and SEM photograph, respectively, of a ceramic article made according to the present invention.

The preferred embodiment of the invention will be described hereinbelow and illustrated by examples.

DESCRIPTION OF THE PREFERRED EMBODIMENT

Refractory and hard ceramic articles have been conventionally made of titanium diboride, usually admixed with other refractory compounds to further improve the properties of titanium diboride. Sintered titanium diboride is a hard, refractory, generally corrosion resistant substance, which is relatively inexpensive to manufacture. Moreover, titanium diboride is an electrical conductor, having resistivity of about 10–100 $\mu$ohm.cm at elevated temperatures (600° C.). Titanium diboride however, is a difficult material to sinter, hence articles made substantially of titanium diboride rarely exceed density values which are higher than 79–85% of the theoretical density, unless special additives, sintering aids and high pressure sintering process steps are applied. Additives and high pressure and temperature treatment, usually increase the density of ceramic articles containing titanium diboride to around 90–95% of the theoretical density. It is to be noted that titanium boride and titanium diboride are generally referred to in the literature interchangeably. It is also known that titanium boride compounds have titanium to boride ratios which are somewhat below the stoichiometrically required 1:2. All such titanium boride compounds will be referred to hereinbelow as titanium diboride.

In order that the shock resistance, heat conductance, fracture toughness, machinability, resistance to corrosion by molten metals and similar desirable properties of the articles may be improved, various nitrides such as aluminum nitride, boron nitride, zirconium nitride and other nitrides which are refractory, have been known to be added in the manufacture of titanium diboride based hard ceramic articles. The admixed nitrides, however, have not notably reduced the porosity of titanium diboride. Porosity in the sintered ceramic article leads to flaws in the structure, which then allows erosion and corrosion by molten metals. It is also known to add zirconia (zirconium dioxide), usually as partially stabilized zirconia, in amounts substantially greater than 2 wt. % (or vol. %) to increase the toughness of titanium diboride, but it has been also found that zirconia additions often diminished the hardness of the titanium diboride containing ceramic article.

It has now been surprisingly found that if zirconia is added in amounts less than 1.5 vol. % and in the form of submicroscopic particle size, that is, generally as particles of 0.7 $\mu$m or less, to the titanium diboride containing ceramic substance, then densities as high as 97% of the theoretical density can be attained. In some practical applications, 99% theoretical density has been routinely achieved. To attain densities in excess of 97% of the theoretical value in the presence of less than 1.5 vol. % of zirconia, only conventional hot-pressing or sintering process steps were needed. The zirconia utilized by the present invention was usually partially stabilized by conventional additives, such as magnesia, yttria, calcia and such like, but unstabilized or fully stabilized zirconia may also be used. Furthermore, it was found that zirconia may be replaced by hafnia (hafnium dioxide) or ceria (cerium dioxide). Hafnia and ceria may also be added in the unstabilized, partially stabilized or in the fully stabilized form.

The ceramic article containing titanium diboride and less than 1.5 vol. % zirconia, hafnia or ceria may contain essentially only titanium diboride, or may also contain one or more of boron nitride, aluminum nitride, zirconium nitride, in amounts ranging from zero to 59 vol. %, depending on the type and nature of the ultimate use of the ceramic article manufactured of the ceramic composition.

Conventional sintering aids may also be added. Cobalt diboride or nickel diboride have been used in the ceramic articles of the present invention, however, the addition of cobalt diboride or nickel diboride is optional. Very high density titanium diboride containing sintered ceramic articles could be obtained in the absence of the above sintering aids, as long as zirconia, hafnia or ceria were present as an oxide additive in less than 1.5 vol. % having particle size 0.7 $\mu$m or less. The hardness of the titanium diboride containing ceramic article was not affected by the presence of small amounts of zirconia, but its resistance to reaction with molten metal was notably increased.

The ceramic articles made of the composition of the present invention are hot-pressed and/or sintered by conventional methods. Hot-pressing and sintering is usually understood to mean the application of pressure in an inert gas as the temperature is increased. Articles may also be obtained by conventional uniaxial pressing in a graphite-faced die. The inert gas is usually argon, helium or similar non-reactive gas. The final sintering temperature may be as high as 1870° C., or even higher. The duration of the pressing and sintering process step extending from room temperature to the final temperature depends on the composition and the nature of the ceramic article obtained, but is usually well in excess of 4 hours.

It is to be noted, that hot-pressing and sintering is used broadly within the terms of the present invention. Cold pressing the ceramic article and subsequently sintering the article at high temperatures under pressure in an inert gas, or casting the article and subsequently sintering at high temperature at varying applied pressures in an inert gas, or uniaxially pressing, are also considered to be included in the description of hot-pressing and sintering. Thus all ceramic articles made of compositions in accordance with the present invention are subjected to a final sintering process step in inert gas at high temperature, i.e. at 1700°–1900° C. for 1–2 hours. The pressure of the inert gas at any time during sintering may vary from the ambient to 3000 psi.

It is also to be noted, that conventional hot-isostatic pressing (HIP) methods may also be applied to obtain the sintered ceramic articles, but densities greater than 97% of the theoretical density of the present compositions may be obtained without the application of conventional HIP or encasing methods.

In the preferred embodiment titanium diboride of particle size less than 15 $\mu$m but preferably less than 5 $\mu$m, zirconium nitride of particle size less than 15 $\mu$m and/or hexagonal boron nitride of particle size less than 15 $\mu$m, and/or aluminum nitride of particle size less than 15 $\mu$m, are mixed in the required proportions with zirconia, hafnia or ceria having particle 0.7 $\mu$m or less, in an amount of 1.5 vol. % or less. The preferred particle size of any of the admixed nitrides is less than 6 $\mu$m. Optionally but not necessarily, cobalt diboride or nickel diboride is also added in 2 vol. % or less. The resulting mixture is ground and further mixed by first ball-milling then vibro-milling for a period in excess of 4 hours, preferably at least 8 hours, but the milling may take as long as 16 hours. Wet milling in an aliphatic alcohol is preferred, more particularly wet-milling in iso-propyl-alcohol.

In another form of the preferred embodiment a portion of the hexagonal boron nitride in the composition is added in the shape of boron nitride fibres, which have been produced by known methods. The ground and milled titanium diboride based mixture, which also contains less than 1.5 vol. % zirconia, hafnia or ceria, is then cast into desired shapes.

The cast ceramic articles are sintered as described above in an inert gas, preferably in argon or helium, by gradually increasing the temperature of the inert gas to 1700°–1900° C. and holding this temperature for 1–2 hours, then allowing the sintered articles to cool.

As discussed above the ceramic articles may also be cold pressed as a separate process step, then sintered in inert gas at temperatures higher than 1850° C.

Alternatively, the ground and milled titanium diboride based ceramic mixture may be cast into an ingot which is hot-pressed uniaxially and sintered by conventional methods in an inert gas, such as argon, and ceramic articles of desired shape are subsequently machined from the sintered ingot.

The ceramic composition described hereinabove may be utilized in the production of evaporating boats which are self-resistance heated. Such boats are often used to evaporate aluminum, zinc, copper and similar relatively low melting metals. The boats are normally composed of titanium diboride and hexagonal boron nitride, and may additionally contain aluminum nitride. Molten metals are usually highly corrosive at the temperature of the evaporating operation, usually in excess of 1200° C., leading to cracks and hot-spots in the body of the boat. The lifespan of conventionally made ceramic boats is usually less than 12–14 hours.

Ceramic boats made in accordance with the present invention are made up of 40–70 vol. % titanium boride, 20–59 vol. % hexagonal boron nitride, and the mixture may also contain aluminium nitride in amounts ranging between 0–25 vol. %. Zirconia, hafnia or ceria having particle size 0.7 $\mu$m or less, is added in about 1.5 vol. % or less. Cobalt diboride or nickel diboride may be added as a sintering aid to the above composition in less than 2 vol. %.

It was found that the fracture toughness of the ceramic evaporating boat may be increased if 5 vol. % of hexagonal boron nitride contained in the ceramic composition is added as boron nitride fibres. Nitride fibres having lengths well in excess of 1 mm, may be added to the milled titanium diboride based mixture. The milling is then continued for a time period not exceeding 15 minutes. The purpose of such brief milling period is to facilitate good mixing without substantially breaking up the fibres. The structure reinforcing properties of the fibres may thus be retained. The fibre-reinforced mixture may be used for casting evaporating boats, or for obtaining uniaxially cast ingots. Boats or articles of any convenient shape may be subsequently machined from the sintered ingots.

EXAMPLE 1

The present invention was utilized in the manufacture of dense ceramic evaporating boats. A ceramic mixture of the following composition was prepared:

49.5 vol. % $TiB_2$, average particle size: 5 $\mu$m, 49 vol. % hexagonal BN; having average particle size of 5 $\mu$m, and 1.5 vol. % partially stabilized zirconia of average particle size less than 0.7 $\mu$m.

The mixture was ball-milled and vibro-milled for a total of 13 hours, then cast into ingots, uniaxially pressed and sintered in argon by gradually raising the temperature to 1860° C. and then holding this temperature for 1 hour. The ingots were allowed to cool in argon, and evaporating boats having dimensions: 6 inch long, 1 inch wide and ½ inch deep, were machined from the ingot. The boats were observed to have resistivities ranging between 520 and 540 $\mu$omh.cm. The density of the boats was found to be 98.3% of the theoretical density. Conventionally produced evaporating boats having generally similar composition but containing no zirconia, were found to have only 96% theoretical density.

Figure 1B:
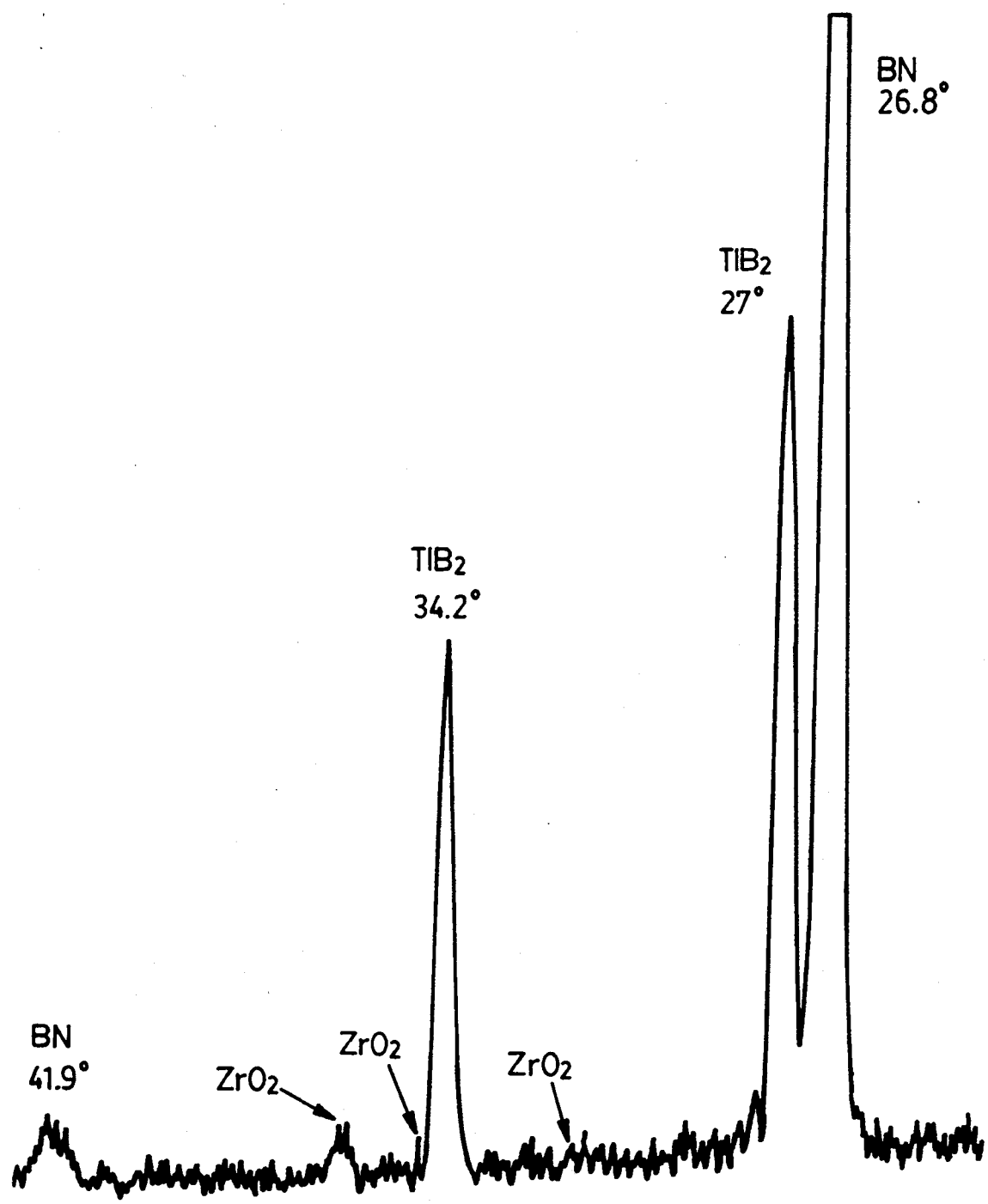
Figure 1C:
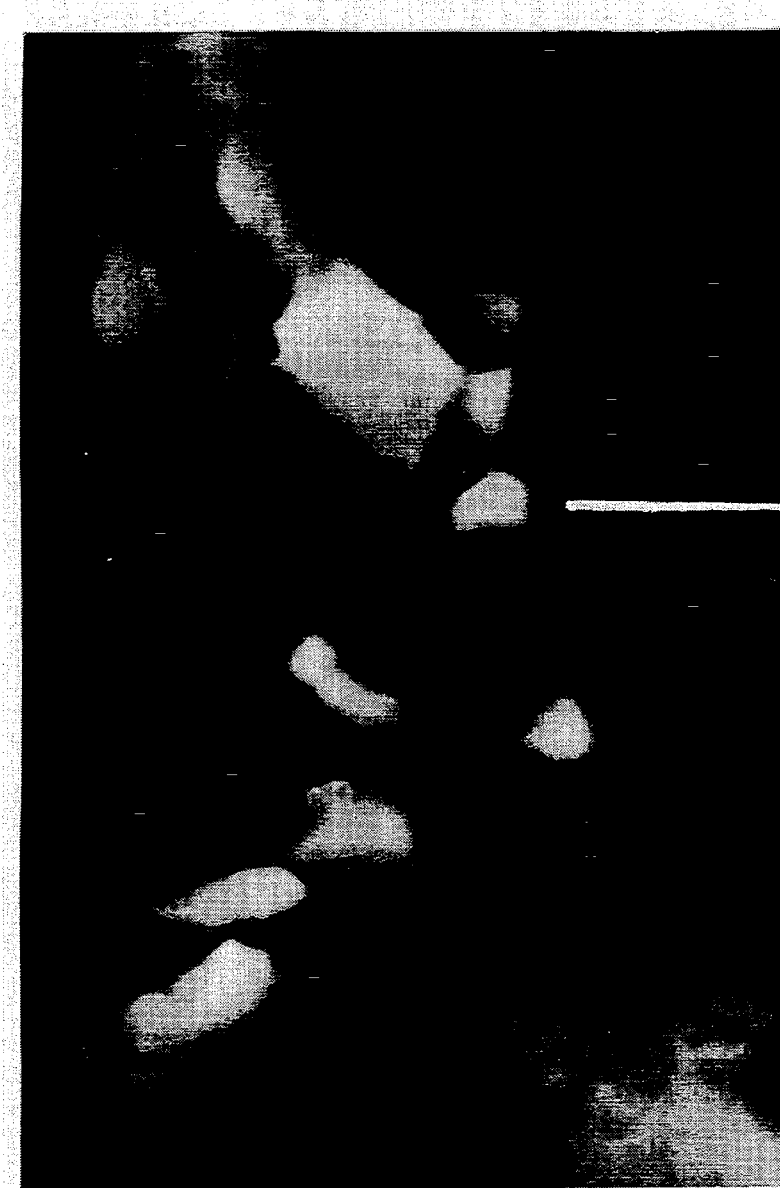

FIG. 1/a and 1/b represent EDAX and X-ray diffraction patterns taken on a polished section of a ceramic boat manufactured as described above, indicating that the boat is composed of titanium diboride, boron nitride and a small amount of zirconia. FIG. 1/a is the EDAX pattern taken in 0–60 keV range showing a zirconia peak and a titanium diboride peak. FIG. 1/b is an X-ray diffraction pattern of the boat representing a wider range of peaks, showing clearly that the boat is made of titanium diboride and boron nitride. The zirconia peaks are barely discernible, indicating that zirconia is present in about 1% only. FIG. 1/c is a SEM photograph taken of a small area of the polished section of the boat, showing zirconia particles of size generally less than 0.7 $\mu$m, embedded between the grains of titanium boride and boron nitride.

It is to be noted that the boat produced in accordance with the present invention has density closer to the theoretical density and thereby lower porosity, than conventionally produced evaporating boats. Hence the boat of the present invention is likely to be corroded by molten metal such as aluminum, to a lesser degree and therefore is expected to have a longer useful life.

EXAMPLE 2

Compositions based on titanium diboride and also containing aluminium nitride and zirconium nitride in 30–54 vol. %, are particularly useful as cutting tool inserts.

Ceramic cutting tool inserts were made of a composition containing 55.2 vol. % titanium diboride, 36 vol. % zirconium nitride, 6 vol. % aluminium nitride, 1.2 vol. % partially stabilized zirconia and 1.6 vol. % cobalt diboride. The composition was ball-milled for 8 hours and then vibro-milled for further 4 hours. The ground mixture was cast into shapes, and sintered and pressed in argon at 1850° C. at 2000 psi. The sintering was conducted by gradually raising the temperature in six hours and holding it at 1850° C. for 2 hours.

The density of the cutting insert was found to be 98.2% of the theoretical density. A conventional cutting insert of similar composition, but not containing zirconia was found to have 95.5% theoretical density. Hardness of the present cutting tool insert was measured by the indentation method to be 21.7 GPa, and the fracture toughness 7.1 MPa.m$^{\frac{1}{2}}$.

Cutting tool inserts made as described above were particularly effective in cutting aluminum-12% silicon alloy pieces used in making automotive transmission equipment. 18,000 transmission parts were made with the cutting tool of the present invention before the cutting tool insert was considered to have lost its cutting edge and was discarded. In a comparative test a conventional carbide cutting tool was rendered worn out and unusable after having cut 4000 parts.

The present invention may also be utilized in the manufacture of hard, dense, impact-resistant sintered ceramic plates of any desired shape. Such impact-resistant ceramic articles may have applications as protective panels. It was found that a sintered ceramic plate made of titanium boride, containing 1.5 vol. % or less partially stabilized zirconia of smaller than 0.7 μm particle size, and optionally, less than 2 vol. % conventional sintering aid such, as cobalt diboride or nickel diboride, exhibited high impact resistance. The sintered plate had density in excess of 97.5% of the theoretical density. The hardness of the sintered ceramic plate was found to be greater than 23 GPa measured by the indentation method. It may thus be observed that the plate was highly suitable to be used as armour-plate.

The composition of the present invention is well suited for use in the manufacture of nozzles, extrusion dies and similar articles, which are required to resist wear and tear by molten metal flowing through them or jets of high velocity fluid streams carrying abrasives. Ceramic articles which are designed to facilitate the passage of molten metal or high velocity fluids carrying abrasives, that is ceramic articles such as nozzles, extrusion dies, exit ports for furnaces and tundishes, water-jet cutters and similar attachments, will be referred to hereinbelow collectively as nozzles. Sintered ceramic nozzles may be manufactured in accordance with the present process having the following composition ranges: titanium diboride in 80–98.5 vol. % mixed with aluminium nitride and/or zirconium nitride in 0–20 vol. %. To this mixture zirconia, hafnia or ceria having particle size 0.7 μm or less, is added in amounts of 1.5 vol. %. The above mixture may optionally contain a sintering aid in 2 vol. %, such as cobalt diboride or nickel diboride.

EXAMPLE 3

Extrusion die nozzles were obtain from a mixture having the following composition:

Titanium diboride, average particle size 5 μm: 58 vol. %

Zirconium nitride, average particle size 6 μm: 39 vol. %

Partially stabilized zirconia, having average particle

| | |
|---|---|
| size of 0.6 μm: | 1.4 vol. % |
| and cobalt diboride: | 1.6 vol. % |

The mixture was ball-milled and vibro-milled for 12 hours in presence of iso-propyl alcohol. The ground and milled mixture then was cast into extrusion die nozzles and subsequently sintered in argon under pressure, raising the temperature of the sintering equipment to 1600° C. in 6 hours. The heat treatment of the ceramic extrusion die nozzles was completed by sintering in argon at 1850° C. for 2 hour duration.

The nozzles obtained had 98.1% theoretical density. The extrusion die nozzles were used to extrude metallic parts composed of an alloy of aluminium containing 12% silicon. The wear resistance and lifespan of the extrusion die substantially exceeded those of conventional extrusion dies.

It can thus be seen a wide range of hot- or cold-pressed and sintered ceramic articles may be advantageously obtained by varying and adjusting the composition described hereinabove to the particular properties required by the designed use the ceramic article. The sintered ceramic articles may be manufactured by relatively inexpensive high temperature process steps. The sintered ceramic articles so obtained had densities close to the theoretical density of the particular composition, and thus had high hardness and fracture toughness and substantial resistance to corrosion by molten metals. The sintered ceramic articles were particularly well suited for applications where such properties were required.

The range of advantageous properties of the ceramic composition disclosed hereinabove may be further extended by optionally including an amount of titanium carbide in the ceramic mixture.

Although the present invention has been described with reference to the preferred embodiment, it is to be understood that modifications and variations may be resorted to without departing from the spirit and scope of the invention, as those skilled in the art readily understand. Such modifications and variations are considered to be within the purview and scope of the invention and the appended claims.

We claim:

1. A mixture of particles for the manufacture of sintered ceramic articles, essentially consisting of:
   titanium diboride in 40–98.5 vol. %,
   an oxide selected from the group consisting of zirconia, hafnia and ceria, in 0.5–1.5 vol. %, said oxide having particle size of 0.7 μm or less, and
   at least one refractory nitride selected from the group consisting of aluminum nitride, zirconium nitride and hexagonal boron nitride, in 4–59 vol. %, wherein the particle size of said oxide is substantially smaller than the particle size of said diboride and said nitride present in said mixture of particles, and the density of the sintered ceramic article manufactured from said mixture of particles is greater than 97% of the theoretical density of said mixture of particles.

2. A mixture of particles for the manufacture of sintered ceramic articles as claimed in claim 1, wherein said oxide is zirconia, and said zirconia is selected from the group consisting of unstabilized, partially stabilized and fully stabilized zirconia.

3. A mixture of particles for the manufacture of sintered ceramic articles as claimed in claim 1, additionally containing a sintering aid in 1–2 vol. %, selected from the group consisting of cobalt diboride and nickel diboride.

4. A mixture of particles for the manufacture of a sintered ceramic plate, essentially consisting of:
   titanium diboride in 96–98.5 vol. %,
   an oxide selected from the group consisting of zirconia, hafnia and ceria, in 0.5–15 vol % said oxide having particle size of 0.7 μm or less, and optionally,
   a sintering aid selected from the group consisting of cobalt diboride and nickel diboride, in 1–2 vol. %, wherein the particle size of said oxide is substantially smaller than the particle size of said diboride present in said mixture of particles, and the density of said sintered ceramic plate manufactured from said mixture of particles is greater than 97% of the theoretical density of said mixture of particles.

5. A mixture of particles for the manufacture of a sintered ceramic plate as claimed in claim 4, wherein said oxide is zirconia, and said zirconia is selected from the group consisting of unstabilized, partially stabilized and fully stabilized zirconia.

6. A mixture of particles for the manufacture of a sintered ceramic cutting tool insert, essentially consisting of:
   titanium diboride in 45–70 vol. %,
   zirconium nitride in 30–54 vol. %,
   an oxide selected from the group consisting of zirconia, hafnia and ceria, in 0.5–15 vol % said oxide having particle size of 0.7 μm or less, and optionally,
   a sintering aid, selected from the group consisting of cobalt diboride and nickel diboride, in 1–2 vol. %, wherein the particle size of said oxide is substantially smaller than the particle size of said diboride and said nitride present in said mixture of particles, and the sintered ceramic cutting tool insert manufactured from said mixture of particles has density greater than 97% of the theoretical density of said mixture of particles, hardness greater than 20 GPa measured by the indentation method and fracture toughness greater than 5 MPa.m$^{\frac{1}{2}}$.

7. A mixture of particles for the manufacture of a sintered ceramic cutting tool insert as claimed in claim 6, further containing aluminum nitride in 4–30 vol. %.

8. A mixture of particles for the manufacture of a sintered ceramic nozzle essentially consisting of:
   titanium diboride in 55–94 vol. %,
   at least one refractory nitride selected from the group consisting of aluminum nitride and zirconium nitride, in 5–45 vol. %,
   an oxide selected from the group consisting of zirconia, hafnia and ceria, in 0.5–1.5 vol. %, said oxide having particle size of 0.7 μm or less, and optionally,
   a sintering aid, selected from the group consisting of cobalt diboride and nickel diboride, in 1–2 vol. %, wherein the particle size of said oxide is substantially smaller than the particle size of said diboride and nitride present in said mixture of particles, and the sintered ceramic nozzle manufactured from said mixture of particles has density greater than 97% of the theoretical density of said mixture of particles and hardness greater than 20 GPa measured by the indentation method.

9. A mixture of particles for the manufacture of a sintered, electrically conductive ceramic evaporating boat, essentially consisting of:
   titanium diboride in 40–79 vol. %,
   hexagonal boron nitride in 20–59 vol. %,
   an oxide selected from the group consisting of zirconia, hafnia and ceria, in 0.5–1.5 vol % said oxide having particle size of 0.7 μm or less, and optionally,
   a sintering aid, selected from the group consisting of cobalt diboride and nickel diboride, in 1–2 vol. %, wherein the particle size of said oxide is substantially smaller than the particle size of said diboride and nitride present in said mixture of particles, and the sintered electrically conductive ceramic evaporating boat manufactured from said mixture of particles has generally non-directional properties, density greater than 97% of the theoretical density of said mixture of particles and resistivity lower than 800 μohm.cm.

10. A mixture of particles for the manufacture of a sintered, electrically conductive ceramic evaporating boat as claimed in claim 9, wherein a portion of said hexagonal boron nitride is added in the form of boron nitride filaments, said filaments having length in excess of 50 μm and diameter ranging between 4 and 10 μm.

11. A mixture of particles for the manufacture of a sintered, electrically conductive ceramic evaporating boat, as claimed in claim 9, further containing aluminium nitride in 4–25 vol. %.

12. A process for manufacturing a sintered ceramic article comprising the steps of:
   i) Mixing titanium diboride of particle size less than 15 μm, in an amount of 40–98.5 vol. %, at least one refractory nitride selected from the group consisting of aluminum nitride, zirconium nitride and hexagonal boron nitride, said nitride having particle size less than 15 μm, in an amount of 4–59 vol. %, an oxide selected from the group consisting of zirconia, hafnia and ceria, having particle size less than 0.7 μm, in 0.5–1.5 vol. %, and optionally, a sintering aid selected from the group consisting of cobalt diboride and nickel diboride, in 1–2 vol. %, to obtain a mixture of ceramic substances;
   ii) Grinding the mixture of ceramic substances so obtained in a ball mill, optionally followed by milling in a vibro-mill;
   iii) Obtaining a cast ceramic article of said ground mixture of ceramic substances;
   iv) Sintering the cast ceramic article so obtained in an inert gas atmosphere at a temperature not exceeding 1950° C., and
   v) Allowing the sintered ceramic article to cool in said inert gas atmosphere.

13. A process as claimed in claim 12, wherein said cast ceramic article obtained in step iii) is an ingot.

* * * * *